United States Patent [19]

Sahakian

[11] Patent Number: 5,177,996
[45] Date of Patent: Jan. 12, 1993

[54] LIQUID LEAK DETECTION CABLE

[75] Inventor: Jack A. Sahakian, Phoenix, Ariz.

[73] Assignee: W. L. Gore & Associates, Inc., Newark, Del.

[21] Appl. No.: 796,565

[22] Filed: Nov. 21, 1991

[51] Int. Cl.[5] ............................................. G01M 3/16
[52] U.S. Cl. .................................... 73/40; 73/40.5 R; 340/605; 324/533
[58] Field of Search ............... 73/40, 40.5 R; 340/605; 324/533

[56] References Cited

U.S. PATENT DOCUMENTS

| | | | |
|---|---|---|---|
| 3,564,526 | 2/1971 | Butts | 340/242 |
| 4,206,632 | 6/1980 | Suzuki | 73/40.5 |
| 4,862,066 | 8/1989 | Sato et al. | 324/65 |
| 4,877,923 | 10/1989 | Sahakian | 174/11 |
| 4,910,998 | 3/1990 | Willis et al. | 73/40.5 R |
| 4,918,977 | 4/1990 | Takahashi et al. | 73/40.5 R |
| 4,926,129 | 5/1990 | Wasley et al. | 340/605 |

FOREIGN PATENT DOCUMENTS 2218554 11/1989 United Kingdom ........... 73/40
2221760 2/1990 United Kingdom ........... 73/40

Primary Examiner—Hezron E. Williams
Assistant Examiner—George M. Dombroske
Attorney, Agent, or Firm—Gary A. Samuels

[57] ABSTRACT

A leak detection cable for selectively sensing liquid organic chemicals is not affected by liquid water or water vapor. The cable includes a first electrical conductor and a second electrical conductor disposed in a coaxial or twin lead configuration. In the coaxial configuration, a porous insulation layer is disposed between the conductors, and a vapor-proof insulation layer surrounds the conductors. In the twin lead configuration, the conductors are encapsulated in a porous insulation layer which is surrounded by a vapor-proof insulation layer. The vapor-proof insulation allows passage of liquid organic chemicals while excluding water vapors and liquid water. The vapor-proof insulation includes a microporous insulation such as expanded, microporous polytetrafluoroethylene (ePTFE) which has been impregnated with a wax which is soluble in the liquid organic chemicals being detected.

15 Claims, 4 Drawing Sheets

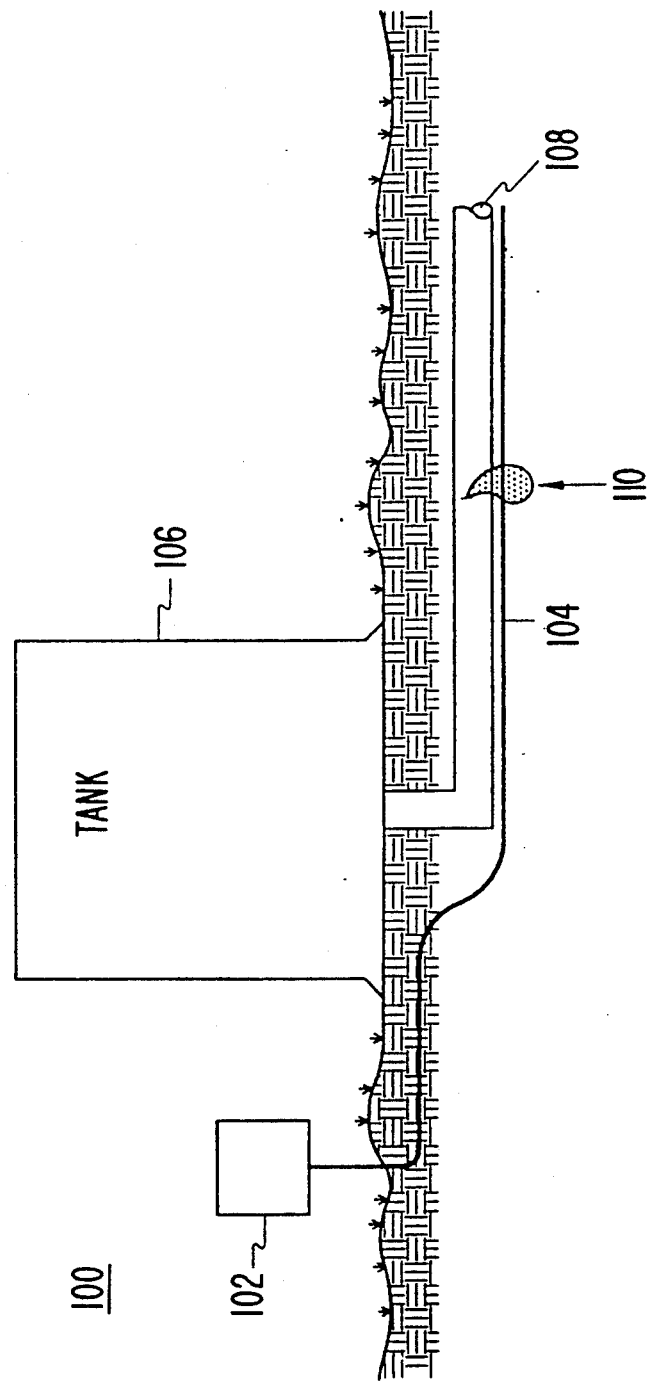

LIQUID LEAK DETECTION CABLE

BACKGROUND OF THE INVENTION

1. Field of the Invention

This invention relates generally to the field of leak detection, wherein a leaking fluid causes an impedance change in a sensing cable and the impedance change is detected as an indication of the leak.

2. Related Art

A variety of liquid organic chemicals (e.g., oils, crude oil, refined petroleum products, gasoline, kerosene, organic solvents, and the like) are stored in underground tanks and transported through buried pipelines. Leakage from these tanks and pipelines can contaminate ground water and cause extensive environmental damage. Further, leaks are difficult to detect and often are not detected until extensive environmental damage has already occurred.

One method of detection has been to run a cable adjacent to the underground pipeline or tank. The cable includes a pair of conductors (e.g., coaxial or twin lead) surrounded by a porous insulation such as expanded, microporous polytetrafluoroethylene (ePTFE). ePTFE is hydrophobic (not permeable to liquid water) but permeable to liquid organic chemicals. If a leak occurs, the liquid organic chemical will permeate the insulation and will cause a change in its dielectric properties such that the electrical characteristics (i.e., impedance) between the conductors is changed. This resulting impedance change can be sensed at a remote end of the cable.

U.S. Pat. Nos. 3,981,181 to Ochiai, 4,029,889 to Mizuochi, 4,206,632 to Suzuki, 4,594,638 to Suzuki et al., and 4,877,923 to Sahakian provide examples of conventional leak detection cables.

There are generally two types of monitoring schemes used with leak detection cables: time domain reflectometry (TDR) and capacitance measurement. Both methods are well known in the art. In using the TDR method, one or more electrical pulses are transmitted down a leak detection cable and the cable is monitored for reflections (i.e., return energy from the incident pulses). Reflections are caused by changes in the characteristic impedance of the cable. TDR can be used to precisely determine the occurrence and location of the impedance change (i.e., liquid leak) along the cable.

A decrease in the impedance of a cable resulting from a leak corresponds to an increase in the capacitance of the cable. The change in capacitance can be measured from a remote end of the cable. Capacitance measurement involves charging the leak detection cable with a charging current, monitoring the voltage across the cable and the charge time, and then determining the total capacitance of the cable therefrom. Capacitance measuring circuits tend to be simpler than the TDR circuits for leak detection. However, unlike TDR, the capacitance measuring method is unable to determine the location of the leak.

While conventional leak detection cables are acceptable for most uses, they are often unacceptable for use in a highly humid environment or when submerged in liquid water at elevated temperatures. Under these conditions, the hydrophobic insulation layer(s) may be permeated by water vapors. Materials such as ePTFE have a unique hydrophobic property that allow a similar surface energy liquid (like most hydrocarbon liquids) to permeate them while not allowing permeation by relatively higher surface energy liquids such as water. However, the open pore structure of the materials will allow vapors to enter. These vapors can condense and change the dielectric constant of the insulation layer, resulting in a decrease in the impedance of the leak detection cable. With respect to the capacitance measuring method, this change in impedance will result in an increase in the overall capacitance of the leak detection cable and produce false alarms (i.e., misleading leak detection information).

Even small amounts of water vapor can have a significant impact on the overall dielectric constant of the insulation layer because the dielectric constant of water is, for example, approximately sixty times greater than that of ePTFE.

The capacitance measuring method of leak detection appears to be most susceptible to false alarms resulting from water vapor penetration.

What is needed is a leak detection cable for detecting liquid organic chemicals which is not susceptible to permeation by water vapors.

SUMMARY OF THE INVENTION

The invention is a liquid organic chemical detection and location cable which is impervious to liquid water and water vapors. The cable, which may be manufactured in a coaxial or a twin lead configuration includes a layer of vapor-proof insulation which prevents water and water vapors from penetrating the area proximate the conductors.

The insulation layer is a microporous plastic (e.g., ePTFE) which has been impregnated with wax. The wax provides selective blocking by excluding water vapors. Liquid organic chemicals may still permeate the insulation layer by dissolving the wax. The wax material may be selected for optimal solubility in the liquid organic chemical to be detected.

Impregnation of wax into the pores of the plastic insulation allows the wax to maintain its mechanical integrity while providing an effective vapor barrier. The insulation layer acts as the load bearing member and will absorb most of the energy from flexure stress.

BRIEF DESCRIPTION OF THE DRAWINGS

FIG. 1 is a diagram showing a leak detection system.

PREFERRED EMBODIMENT OF THE PRESENT INVENTION

Figure 2A:
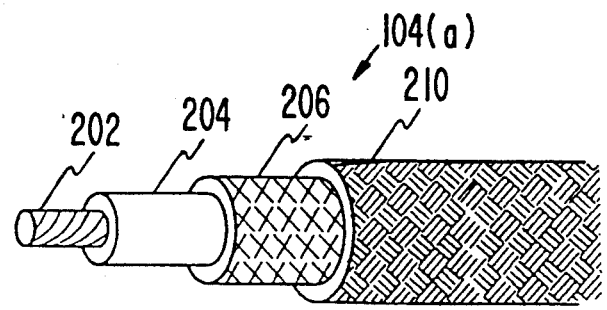
FIGS. 2(a) and (b) show cutaway perspective views of conventional leak detection cables 104(a) and 104(b).

The invention is a leak detection cable which is not susceptible to impedance changes resulting from permeation by water vapor. The various embodiments of the cable can be used to sense many chemical products including non-conductive solvents such as ketones, aromatic organic compounds, alcohols, chlorinated hydrocarbons, turpentine, and the like; vegetable oils (e.g., corn oil, olive oil, soya oil, linseed oil, and the like); and non-conductive hydrocarbon products (e.g., crude oils, gasoline, kerosene, diesel fuel, and the like). For ease of reference, the term "liquid organic chemicals" will be used herein to refer to these various chemicals.

Throughout this specification, the term "insulation" is used. "Insulation" refers to a porous, electrically insulating material. By "porous" it is meant a material which will allow passage (i.e., permeation) of liquid organic chemicals therethrough. Three specific types of insulation are used: standard insulation, microporous insulation, and vapor-proof insulation. Examples of standard insulation include most any fibrous material which will provide electrical insulation while still allowing passage of liquid organic chemicals therethrough (e.g., polyethylene yarn).

Microporous insulation is a selective insulation made from microporous plastic polymers. By "selective", it is meant that only liquids having a certain surface energy will pass therethrough. That is, microporous insulation has the feature that it will not allow passage of liquids with a relatively high surface energy such as liquid water. Water vapors, however, will permeate microporous insulation. Examples of microporous insulations include porous polyolefin (e.g., polyethylene or polypropylene), porous polytetrafluoroethylene (PTFE), and expanded, microporous polytetrafluoroethylene (ePTFE). Microporous insulation is a special kind (i.e., species or sub-set) of standard insulation.

Vapor-proof insulation is microporous insulation which has been treated according to the present invention to make it impermeable to water vapor. Thus, vapor-proof insulation is a special kind of microporous insulation. Vapor-proof insulation will allow passage of liquid organic chemicals but will block or exclude water and water vapor.

The inventor has discovered that microporous insulation may be made impervious to water vapor (vapor-proof) by impregnating the material with a wax (e.g., a hydrocarbon based wax such as paraffin wax) as discussed below. The wax provides selective blocking by excluding water vapors. Liquid organic chemicals, however, may still permeate the insulation layer by dissolving the wax. The wax material may be selected for optimal solubility in the liquid organic chemical to be detected.

While various materials may be used, ePTFE is the preferred material for all insulation in the leak detection cable of the invention. ePTFE is known in the industry as "Gore-Tex", which is a trademark of W. L. Gore and Associates, Inc., of Newark, Del. This material is described in detail in U.S. Pat. Nos. 3,953,566 and 4,187,390, both of which are incorporated herein by reference.

The porosity of ePTFE can be controlled during manufacturing by varying the number of voids or pores therein. Varying the porosity allows the material to be custom tailored to a specific application. ePTFE may be applied to a conductor by known methods. For example, it can be wrapped around a conductor in the form of a porous sintered tape; or, it can be extruded onto a conductor. The preferred method for applying ePTFE is by paste extruding PTFE resin onto a conductor and then allowing it to expand and sinter to achieve the requisite porosity and mechanical strength.

A conventional leak detection system 100 is shown in FIG. 1 in the environment of a storage tank 106 and a pipeline 108. System 100 includes an impedance monitoring circuit 102 and a leak detection cable 104. Storage tank 106 and pipeline 108 contain a liquid organic chemical (e.g., fuel oil) for which leak detection is desired. Cable 104 is laid adjacent tank 106 and pipeline 108. One end of cable 104 is connected to impedance monitoring circuit 102. The other end of cable 104 may be unterminated or terminated in a specified impedance depending on the particular impedance monitoring circuit selected. A leak 110 in pipeline 108 is shown for illustration purposes.

A first conventional embodiment of cable 104 is shown is detail in FIG. 2(a). Cable 104(a) includes an inner conductor 202, a first insulation layer 204, a coaxial outer conductor 206, and an outer protective layer 210.

First insulation layer 204 is a microporous insulation. Outer conductor 206 is of braided conductive metal construction and is fluid permeable. Protective layer 210 is a permeable material such as polyethylene or polyester and can be woven or braided.

Cable 104(a) may be used to sense liquids, such as hydrocarbons, which are capable of permeating first insulation layer 204. Ideally, cable 104(a) should not be affected by liquid water. However, water may saturate conductor 206 and may further permeate the space between outer conductor 206 and first insulation layer 204 such that the impedance of the leak detection cable may be altered. Further, water may cause outer conductor 206 to become corroded. Thus, this cable is not ideal for accurate detection where liquid water may be present.

Figure 2B:
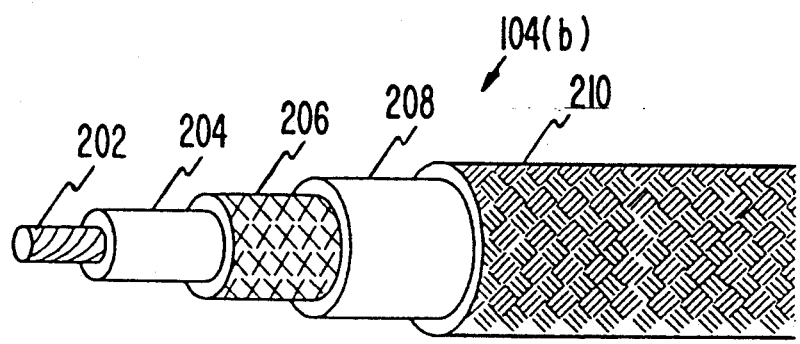

A second conventional embodiment of cable 104 is shown in detail in FIG. 2(b). Cable 104(b) is substantially similar to cable 104(a) except for the addition of a second insulation layer 208. Like first insulation layer 204, second insulation layer 208 is microporous insulation. Second insulation layer 208 prevents liquid water from reaching outer conductor 206 such that the impedance of cable 104(b) will not be affected by liquid water.

In operation, a leaking liquid organic chemical which comes into contact with cable 104(b) will pass through outer protective layer 210, second insulation layer 208, and outer conductor 206. It will then permeate into the pores of first insulation layer 204, changing the dielectric constant of the insulation as discussed above. Due to its relatively high surface energy, water will not permeate insulation layers 204 and 208. This allows conventional leak detection cable 104(b) to be used in adverse environmental conditions such as underwater or buried underground.

However, these conventional leak detection cables are not acceptable for use in a highly humid environment or when submerged in liquid water at elevated temperatures. Under these conditions, the hydrophobic insulation layer(s) may be permeated by water vapors as discussed above. These water vapors can condense and change the dielectric constant of the insulation layer, resulting in a decrease in the impedance of the leak detection cable. This change in impedance can produce false alarms in the leak detection/impedance monitoring circuitry.

The present invention is a leak detection cable which is not susceptible to penetration by water vapors. The preferred embodiment of the invention is described with reference to the figures. Note that like reference numbers in the figures indicate like elements.

Figure 3:
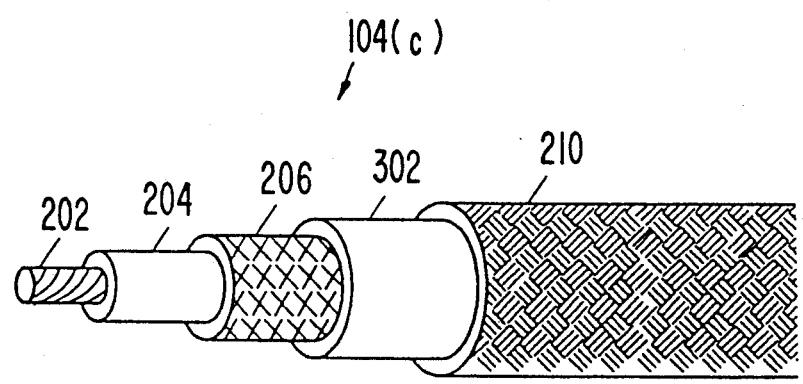
FIG. 3 is a cutaway perspective view of the preferred embodiment of the leak detection cable of the present invention.

Referring first to FIG. 3, leak detection cable 104(c) comprises an inner conductor 202, a first insulation layer 204, a coaxial outer conductor 206, and a second insulation layer 302. Cable 104(c) may further include an outer protective layer 210.

Inner conductor 202 is a stranded or solid conductive wire (e.g., copper). Conductor 202 is enclosed in first insulation layer 204.

While microporous insulation is preferred for first insulation layer 204, a hydrophobic capability is not required and any standard insulation may be used. A Hydrophobic capability is not required because second insulation layer 302 (discussed below) will prevent liquid water and water vapor from ever reaching first insulation layer 204. In fact, because the selective blocking is performed by second insulation layer 302, first insulation layer 204 may simply comprise plastic spacer elements such as disks or a helical wound plastic structure.

Outer conductor 206 is a fluid permeable metal conductor which defines a lumen or hollow bore passing through its center. It is preferred that conductor 206 be made from braided metal (e.g., copper) wires. However, it may also be a conductive metal layer which has been perforated to provide the porosity required to allow passage of liquid organic chemicals (particularly hydrocarbons).

Second insulation layer 302 is similar to first insulation layer 204 in that it must be porous to liquid organic chemicals. However, second insulation layer 302 must be hydrophobic and impermeable to water vapors in order to prevent water and water vapor from penetrating into outer conductor 206. Thus, second insulation layer 302 is a vapor-proof insulation as discussed above.

Finally, outer protective layer 210 provides mechanical protection (e.g., abrasion resistance) to the cable. Outer protective layer 210 must be porous to the liquid sought to be detected. It is preferred that it is made from polyethylene or polyester and that it be braided, woven, or netted in order to aid permeation by liquids through a capillary or wicking action.

In manufacturing cable 104(c), wax is applied to second insulation layer 302 by conventional methods. For example, the cable (having insulation layer 302 as the outermost layer) may be submersed in a continuous process of molten wax at a specific high temperature for a specified time. This will allow controlled permeation of wax into the pores of the insulation to a specific depth. The cable is then cooled to solidify the wax.

The depth of penetration of wax into the insulation layer may be varied to affect the time required for penetration of the insulation layer by a liquid organic chemical during leak detection. A fully impregnated insulator will provide optimal protection against admission of water vapors, however, it will also lengthen the time required for a liquid organic chemical to pass through the insulator for detection.

The inventor has discovered a significant advantage in impregnating the wax into the pores of the insulation. Impregnation in this manner allows the wax to maintain its mechanical integrity. The insulation layer acts as the load bearing member and will absorb most of the energy when the cable is placed under flexure stress. This prevents the wax from cracking and breaking away when flexed, as would occur with a wax coating.

In this sample embodiment of cable 104(c), inner conductor 202 is a 14 AWG nickel plated copper wire. First insulation layer 204 is made from ePTFE and has an outer diameter of 0.177 inches (4.5 mm). Outer conductor 206 is a braided combination of strands of 36 AWG nickel plated copper wire having 80% nominal coverage. Second insulation 302 is made from ePTFE, has an outer diameter of 0.268 inches (6.8 mm), and is completely impregnated with paraffin wax. Outer protective layer 210 is made from polyester braided monofilament.

Figure 4:
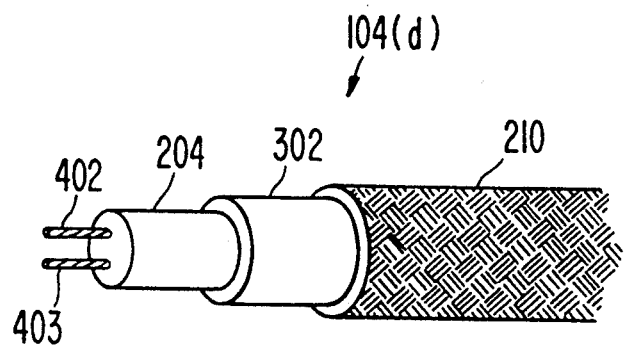
FIG. 4 is a cutaway perspective view of a twin lead embodiment of the leak detection cable of the present invention.

An alternate embodiment of the invention is shown in FIG. 4. Cable 104(d) comprises a pair of parallel conductors 402,403 (e.g., twin lead), a first insulation layer 204, and a second insulation layer 302. Cable 104(d) may further include an outer protective layer 210.

Conductors 402,403 are stranded or solid conductive wires (e.g., copper) which are encapsulated in first insulation layer 204 in a spaced apart relationship. Insulation layer 204 is a standard insulation layer as discussed above. Insulation layer 302 is a vapor-proof insulation as discussed above.

Operation of cable 104(d) is similar to cable 104(c) discussed above. Liquid organic chemicals which penetrate second insulation layer 302 will be absorbed into first insulation layer 204. This will cause a change in the dielectric properties of first insulation layer 204 and cause a decrease in the impedance between conductors 402,403.

In an alternate embodiment of cable 104(d), first insulation layer 204 and second insulation layer 302 may be formed from a single layer of microporous insulation. This is accomplished by partially impregnating the microporous insulation such that two distinct sub-layers of insulation are formed. The inner sub-layer will be microporous insulation. The outer sub-layer will be vapor-proof by virtue of its impregnation with wax. That is, conductors 402,403 are encapsulated in a layer of microporous insulation which has been impregnated with wax at its surface only. The wax must not completely impregnate the microporous insulation such that it enters the area between the parallel conductors, because the wax (being an organic chemical) will increase the dielectric constant of the insulation such that the cable is rendered incapable of detecting the presence of a liquid organic chemical.

Figure 5:
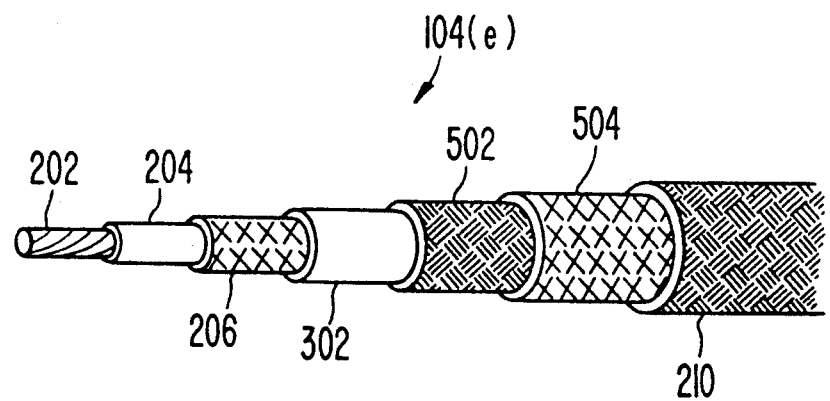
FIG. 5 is a cutaway perspective view of an alternate embodiment of the leak detection cable of the present invention for sensing both water and liquid organic chemicals.

Yet another embodiment of the invention is shown in FIG. 5. Cable 104(e) is a water and liquid organic chemical leak detection cable. Leak detection cable 104(e) comprises an inner conductor 202, a first insulation layer 204, a coaxial outer conductor 206, a second insulation layer 302, and an outer protective layer 210; all identical to that of cable 104(c) discussed above. Cable 104(e) further includes a third insulation layer 502 and a third conductor 504 disposed between second insulation layer 302 and outer protective layer 210.

Inner conductor 202, first insulation layer 204, coaxial outer conductor 206, second insulation layer 302, and outer protective layer 210 function similar to that of cable 104(c). However, a liquid organic chemical which contacts cable 104(e) must pass through third conductor 504 and third insulator 502 before reaching second insulator 302.

Third insulation layer 502 is a standard insulation which is specifically adapted to absorb and pass any liquid (including liquid water) which contacts it. Third conductor 504 is a porous metal conductor similar to second conductor 206. These two additional layers give cable 104(e) the feature of being able to detect water.

Water will pass through outer protective layer 210 and third conductor 504, and will be absorbed by third insulator 502. This will cause a change in the dielectric properties of third insulation layer 502 which can be sensed as a change in impedance between second conductor 206 and third conductor 504. Thus, cable 104(e) may be used to detect water (using second conductor 206 and third conductor 504) and liquid organic chemicals (using first conductor 202 and second conductor 206).

Although the invention has been described and illustrated with a certain degree of particularity, it is understood that those skilled in the art will recognize a variety of additional applications and appropriate modifications within the spirit of the invention and the scope of the claims.

What is claimed is:

1. A coaxial leak detection cable comprising:
   a first electrical conductor;
   a second electrical conductor, said second electrical conductor being porous to permit passage of liquid organic chemicals therethrough, said first electrical conductor being disposed in a coaxial arrangement within a lumen of said second electrical conductor;
   a first standard insulation layer disposed between said first and second electrical conductors, said first standard insulation layer being porous enough to allow passage of liquid organic chemicals; and
   a vapor-proof insulation layer surrounding said outer electrical conductor, said vapor-proof insulation layer allowing passage of liquid organic chemicals while excluding water vapors and liquid water.

2. The coaxial leak detection cable of claim 1, wherein said vapor-proof insulation layer comprises ePTFE which has been at least partially impregnated with wax.

3. The coaxial leak detection cable of claim 2, wherein said wax is a hydrocarbon based wax.

4. The coaxial leak detection cable of claim 3, further comprising an outer protective layer surrounding said vapor-proof insulation layer.

5. The coaxial leak detection cable of claim 4, wherein said first standard insulation layer comprises ePTFE.

6. The coaxial leak detection cable of claim 4, further comprising:
   a second standard insulation layer disposed between said vapor-proof insulation layer and said outer protective layer, said second standard insulation layer being porous enough to permit passage of liquid water and liquid organic chemicals therethrough; and
   a third electrical conductor disposed between said second standard insulation layer and said outer protective layer, said third electrical conductor being porous enough to permit passage of liquid water and liquid organic chemicals therethrough.

7. A leak detection cable comprising:
   a first electrical conductor;
   a second electrical conductor disposed in a substantially parallel relationship with first electrical conductor;
   a standard insulation layer encapsulating said first and second electrical conductors; and
   a vapor-proof insulation layer surrounding said standard insulation layer, said vapor-proof insulation layer allowing passage of liquid organic chemicals while excluding water vapors and liquid water.

8. The leak detection cable of claim 7, wherein said first and second electrical conductors are disposed in a spaced-apart twin lead configuration.

9. The leak detection cable of claim 8, wherein said vapor-proof insulation layer comprises an ePTFE material at least partially impregnated with wax.

10. The leak detection cable of claim 9, wherein said standard insulation layer comprises ePTFE.

11. The leak detection cable of claim 10, wherein said wax is a hydrocarbon based wax.

12. The leak detection cable of claim 7, wherein said standard insulation layer and said vapor-proof insulation layer are formed by partially impregnating a single micro-porous insulation layer with wax.

13. The leak detection cable of claim 10, further comprising an outer protective layer surrounding said vapor-proof insulation layer.

14. A coaxial leak detection cable for detecting a leaking liquid organic chemical, the cable comprising:
   a first electrical conductor;
   a second electrical conductor constructed of braided conductive strands so as to permit passage of the liquid organic chemical therethrough, said first electrical conductor being disposed in a coaxial arrangement within a lumen of said second electrical conductor;
   a first insulation layer disposed between said first and second electrical conductors, said first insulation layer being formed from ePTFE, and
   a second insulation layer surrounding said outer electrical conductor, said second insulation layer being formed from ePTFE which has been at least partially impregnated with wax, said wax being soluble in said liquid organic chemical.

15. The coaxial leak detection cable of claim 14, further comprising:
   an outer, abrasion resistant, protective layer surrounding said second insulation layer.

* * * * *